US010574234B2

United States Patent
Kho

(10) Patent No.: US 10,574,234 B2
(45) Date of Patent: Feb. 25, 2020

(54) ELECTRONIC CIRCUIT AND METHODS FOR PRODUCING AND DESIGNING ELECTRONIC CIRCUITS

(71) Applicant: Infineon Technologies AG, Neubiberg (DE)

(72) Inventor: Rex Kho, Holzkirchen (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/279,334

(22) Filed: Feb. 19, 2019

(65) Prior Publication Data
US 2019/0273499 A1    Sep. 5, 2019

(30) Foreign Application Priority Data
Mar. 2, 2018  (DE) .................. 10 2018 104 760

(51) Int. Cl.
*H03K 19/003* (2006.01)
*H01L 27/02* (2006.01)
*G06F 17/50* (2006.01)
*G11C 11/412* (2006.01)

(52) U.S. Cl.
CPC ... *H03K 19/00392* (2013.01); *G06F 17/5072* (2013.01); *G11C 11/412* (2013.01); *H01L 27/0207* (2013.01); *H03K 19/00315* (2013.01); *G06F 2217/02* (2013.01)

(58) Field of Classification Search
None
See application file for complete search history.

(56) References Cited

U.S. PATENT DOCUMENTS

| | | | | |
|---|---|---|---|---|
| 6,812,731 | B1* | 11/2004 | Trimberger | G06F 17/5054 326/10 |
| 8,390,327 | B1* | 3/2013 | Parkhurst | H03K 19/0033 326/11 |
| 2015/0349775 | A1* | 12/2015 | Clark | H03K 19/23 326/10 |

OTHER PUBLICATIONS

Elamaran, V., et al., "Fault-tolerant system design using noval majority voters of 5-modular redundancy configuration," Journal of Engineering Technology, vol. 6, Special Issue on Technology Innovations and Applications, Oct. 2017, pp. 318-328.

* cited by examiner

*Primary Examiner* — Jany Richardson
(74) *Attorney, Agent, or Firm* — Slater Matsil, LLP

(57) ABSTRACT

In accordance with an embodiment, an electronic circuit includes at least five redundant circuit parts, which are configured to execute the same function in order to provide redundancy. The at least five redundant circuit parts are arranged in such a way that critical nodes of fewer than half of the circuit parts lie on an imaginary straight line.

19 Claims, 4 Drawing Sheets

ELECTRONIC CIRCUIT AND METHODS FOR PRODUCING AND DESIGNING ELECTRONIC CIRCUITS

This application claims the benefit of German Application No. 102018104760.6, filed on Mar. 2, 2018, which application is hereby incorporated herein by reference in its entirety.

TECHNICAL FIELD

The present application relates to electronic circuits, methods for producing electronic circuits and methods for designing electronic circuits.

BACKGROUND

Particles with high energy, for example neutrons, protons, alpha radiation and the like (referred to as high-energy particles in the following text), can cause errors in electronic circuits. Some of these errors are referred to as single event upsets (SEU) and single event errors (SEE). When such particles with high energy strike an electronic circuit, they can generate free charge carriers (electrons and/or holes). Said charge carriers can reach critical nodes of the circuit and thus cause errors. Here, critical nodes are nodes whose state and therefore the state of the electronic circuit can be changed by way of such particles with high energy. Examples of such critical nodes are nodes in which a piece of information (for example a bit) is stored. A change in the stored bit value can be caused here by way of the particles with high energy.

In order to avoid such problems caused by free charge carriers, certain rules are used when designing the circuit, such as providing substrate contacts and/or well contacts, via which such free charge carriers can flow away before they reach critical nodes.

However, errors can also occur when such critical nodes are struck directly by particles with high energy. In this case, a state of the node, for example a stored bit value, can also change, wherein, in this case, the measures mentioned above such as substrate contacts or well contacts do not help since the particle or particles strike the critical nodes directly.

In order to solve this problem, multi-bit redundancy is conventionally used together with certain spacing rules. For example, to store a value, three separate memory elements storing the same value can be used. The memory elements are in this case spaced apart from one another in such a way that the probability of a particle with high energy striking two of said three memory elements is kept very low. For this purpose, use is made of the fact that particles with high energy usually move in semiconductor materials such as silicon in a straight line (except for individual scattering events, the probability of which is comparatively low). The spacing of the memory elements is then selected to be greater than the distance that at least the majority of the particles (for example up to a certain energy) in the circuit cover. A distance to be retained can thus be, for example, at least 100 µm, at least 50 µm or at least 20 µm. The selected value also depends here on the degree of reliability intended to be achieved, that is to say how likely a failure may be.

In this way, the probability that two of the three memory elements are struck by a particle is at least greatly reduced.

In the undisturbed case, all three memory elements deliver an identical signal, that is to say an identical stored value. When a memory element is disturbed by a particle with high energy, two of three memory elements still deliver the correct value. The correct value can then be identified by way of a majority decision.

However, with increasing miniaturization of structures, said spacings to be retained can cause problems since, although the structure sizes and therefore the required area for electronic circuits are becoming smaller, the distance that particles in a semiconductor material such as silicon cover can remain the same and therefore the spacing cannot be scaled in the same way. This can lead to the memory elements having to be located in completely different parts of an electronic circuit or could even be located outside of a chip comprising the other components of the electronic circuit. This can at least cause problems in routing.

SUMMARY

In accordance with one exemplary embodiment, an electronic circuit is provided, comprising: at least five redundant circuit parts, which are configured to execute the same function in order to provide redundancy, wherein the at least five redundant circuit parts are arranged in such a way that critical nodes of fewer than half of the circuit parts lie on an imaginary straight line. In this way, in some exemplary embodiments, at most fewer than half of the circuit parts are influenced by a high-energy particle traveling on a straight trajectory.

In accordance with a further exemplary embodiment, an electronic circuit as described above is provided, wherein the at least five redundant circuit parts are interconnected with one another to receive an identical input signal. In some exemplary embodiments, for example, an identical value can thus be stored in the circuit parts or an identical signal can be processed in order to provide redundancy.

In accordance with a further exemplary embodiment, an electronic circuit as described above is provided, wherein the at least five circuit parts are arranged on a chip.

In accordance with a further exemplary embodiment, an electronic circuit as described above is provided, further comprising an evaluation circuit, which is interconnected with the at least five redundant circuit parts and is configured to output an output signal based on signals of the at least five redundant circuit parts and on an error correction method, for example based on carrying out a majority decision. In some exemplary embodiments, a correct signal can thus be specified with a high degree of reliability.

In accordance with a further exemplary embodiment, an electronic circuit as described above is provided, wherein a number of the at least five redundant circuit parts whose critical nodes lie on the imaginary straight line is less than or equal to a number of the at least five redundant circuit parts minus a number of correct signals necessary to carry out the error correction method (for example for a correct majority decision). In some exemplary embodiments, error correction can thus be carried out, for example a correct majority decision can be made, even under the influence of a particle.

In accordance with a further exemplary embodiment, an electronic circuit as described above is provided, wherein a spacing between adjacent circuit parts of the at least five circuit parts is smaller than 100 µm (for example smaller than 50 µm or smaller than 20 µm). In some exemplary embodiments, this can facilitate the routing.

In accordance with a further exemplary embodiment, an electronic circuit as described above is provided, wherein the at least five circuit parts comprise exactly five circuit parts arranged in the shape of a pentagon.

In accordance with a further exemplary embodiment, an electronic circuit as described above is provided, wherein the at least five circuit parts each comprise a memory circuit.

In accordance with another exemplary embodiment, a method for producing an electronic circuit is provided, comprising: providing at least five redundant circuit parts, which are configured to execute the same function in order to provide redundancy, wherein the at least five redundant circuit parts are arranged in such a way that critical nodes of fewer than half of the circuit parts lie on an imaginary straight line. Circuits as described above can thus be produced, for example.

In accordance with a further exemplary embodiment, a method as described above is provided, wherein providing the at least five redundant circuit parts comprises forming the at least five redundant circuit parts on a chip.

In accordance with a further exemplary embodiment, a method as described above is provided, further comprising: interconnecting the at least five redundant circuit parts to receive an identical input signal.

In accordance with a further exemplary embodiment, a method as described above is provided, further comprising: providing an evaluation circuit, and interconnecting the evaluation circuit with the at least five redundant circuit parts, wherein the evaluation circuit is configured to output an output signal based on signals of the at least five redundant circuit parts and on an error correction method, for example based on carrying out a majority decision.

In accordance with a further exemplary embodiment, a method is provided, wherein the at least five redundant circuit parts are arranged in such a way that a number of the at least five redundant circuit parts whose critical nodes lie on the imaginary straight line is less than or equal to a number of the at least five redundant circuit parts minus a number of correct signals necessary to carry out the error correction method, for example to make a correct majority decision.

In accordance with a further exemplary embodiment, a computer-implemented method for designing an electronic circuit is provided, comprising: providing at least five redundant circuit parts, which are configured to execute the same function in order to provide redundancy, in a circuit layout, and arranging the at least five redundant circuit parts in the circuit layout in such a way that critical nodes of fewer than half of the circuit parts lie on an imaginary straight line. A circuit as described above can thus be designed, for example.

In accordance with a further exemplary embodiment, a method as described above is provided, wherein providing the at least five redundant circuit parts comprises providing the at least five redundant circuit parts in a layout of a chip.

In accordance with a further exemplary embodiment, a method as described above is provided, further comprising: providing an interconnection of the at least five redundant circuit parts in the layout to receive an identical input signal.

In accordance with a further exemplary embodiment, a method as described above is provided, further comprising: providing an evaluation circuit in the layout, and providing an interconnection of the evaluation circuit with the at least five redundant circuit parts in the layout, wherein the evaluation circuit is configured to output an output signal based on signals of the at least five redundant circuit parts and on an error correction method, for example based on carrying out a majority decision.

In accordance with a further exemplary embodiment, a method as described above is provided, wherein the at least five redundant circuit parts are arranged in the layout in such a way that a number of the at least five redundant circuit parts whose critical nodes lie on the imaginary straight line is less than or equal to a number of the at least five redundant circuit parts minus a number of correct signals necessary to carry out the error correction method, for example to make a correct majority decision.

The remarks regarding the various exemplary embodiments of the circuit also apply to the corresponding exemplary embodiments of methods described above.

A corresponding computer program and an electronically readable data storage medium having such a computer program are likewise provided.

In accordance with a further exemplary embodiment, a device for designing an electronic circuit is provided, comprising: means for providing at least five redundant circuit parts, which are configured to execute the same function in order to provide redundancy, in a circuit layout, and means for arranging the at least five redundant circuit parts in the circuit layout in such a way that critical nodes of fewer than half of the circuit parts lie on an imaginary straight line.

The above summary serves only as a brief overview of some exemplary embodiments and is not to be interpreted as restrictive.

DETAILED DESCRIPTION OF ILLUSTRATIVE EMBODIMENTS

In the following text, the various exemplary embodiments are explained in more detail with reference to the drawings. These exemplary embodiments serve purely for illustration and are not to be interpreted as restrictive. A description of an exemplary embodiment with a multiplicity of components is thus not to be interpreted to the extent that all of these components are necessary for the implementation. Instead, some components can be replaced by alternative components or be omitted. In addition to the illustrated components, other components, for example components conventionally used in electronic circuits, can also be provided, for example logic circuits. The description of the exemplary embodiments concentrates on specific aspects of electronic circuits, and other parts of such electronic circuits can be implemented in a conventional manner.

Features and components of various exemplary embodiments can be combined with one another in order to form further exemplary embodiments. Variations, modifications and details that are described for one of the exemplary embodiments can also be applied to other exemplary embodiments and are therefore not described repeatedly.

Figure 1:
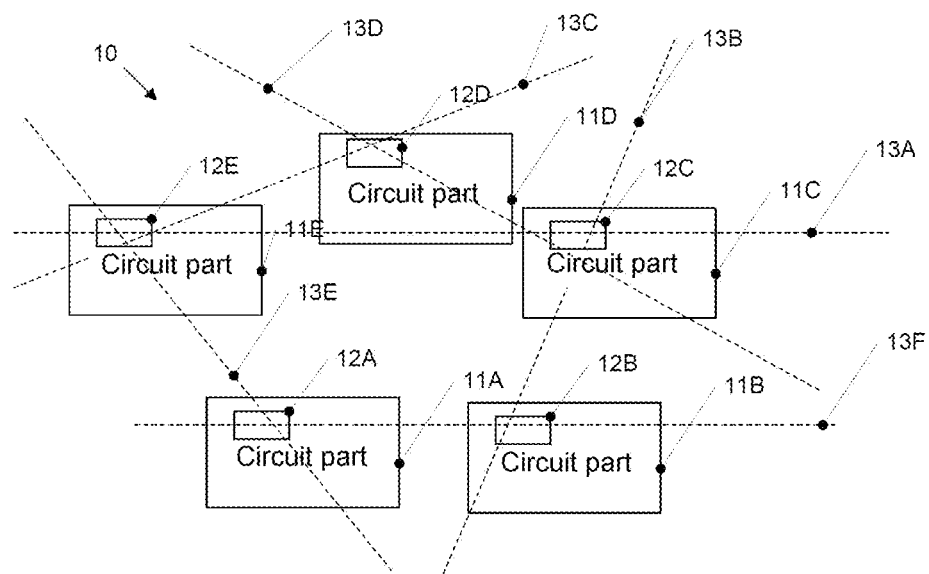
FIG. 1 shows a schematic layout of an electronic circuit in accordance with some exemplary embodiments.

FIG. 1 shows a schematic layout of an electronic circuit in accordance with some exemplary embodiments. The circuit of FIG. 1 has five redundant circuit parts 11A-11E, together referred to as circuit parts 11. In this context, "redundant" means that the circuit parts 11 each provide the same function. For example, the circuit parts 11 can each be memory cells and provide redundancy by virtue of them each storing an identical value. In other exemplary embodiments, the circuit parts 11 can each comprise logic gates, which each provide a logic combination of the same signals and the same type (for example OR combination, OR-AND combination, etc.). This means that, in the event of error-free operation, redundant circuit parts can each provide an identical output signal or identical output signals, for example an output signal representing a stored value or an output signal providing the result of a logic combination. However, memory elements and logic gates serve here only as examples, and any kind of circuit part can be used.

In some exemplary embodiments, the circuit parts 11A-11E can be implemented in the same way, that is to say, for example, can be based on the same circuit. In other exemplary embodiments, the circuit parts 11A-11E can be implemented in a different way and still provide the same function, which is also sometimes referred to as diversity. Various types of memory cells, which still store the same value and therefore provide redundancy, can thus be used.

The circuit parts 11A-11E each have associated critical nodes 12A-12E. A critical node is in this case a node that is sensitive to high-energy particles such as neutrons, protons or alpha particles. Typical energies can be in the range of from 2 to 5 MeV in the case of alpha particles, in the range of from 10 keV to more than 20 MeV in the case of neutrons. Particularly in the case of charged particles such as protons and alpha particles, the energy determines the penetration depth into the material of the circuit, for example silicon. Depending on the energy, for example, alpha particles can cover 50 μm or more in the material before they are absorbed. Uncharged particles such as neutrons as a rule can fly through the circuit completely.

When the critical node of a circuit part (for example the critical node of the circuit part 11A) is struck by such a particle, the state of the node and/or of the circuit part can change. In the case of a memory, the stored value can change (in the case of an individual bit from 0 to 1 or from 1 to 0), for example, and in the case of a logic gate, the output signal of the logic gate can change. Such a change is in most cases only temporary in logic gates, in contrast to memories, but can be critical, in particular, when the temporarily changed value is stored in a following memory, for example a register. In other parts of the circuit parts outside of the critical nodes, such a change is not produced or at least not very likely to be produced when a high-energy particle strikes.

FIG. 1 shows an example for a layout of the circuit parts 11, that is to say an example for an arrangement of the circuit parts 11, for example, on a common chip, on a printed circuit board or on another carrier. The circuit parts are in this case arranged in such a way that critical nodes of fewer than half of the circuit parts lie on an imaginary straight line. That is to say, in the example of FIG. 1 with five circuit parts 11, fewer than three, or in other words at most two, critical nodes of different circuit parts lie on an imaginary straight line. For example, the critical nodes 12A and 12E of the circuit parts 11A and 11E lie on an imaginary straight line 13E, critical nodes 12A and 12B of the circuit parts 11A and 11B lie on an imaginary straight line 13F, critical nodes 12B and 12C of the circuit parts 11B and 11C lie on an imaginary straight line 13D, critical nodes 12D and 12E of the circuit parts 11D and 11E lie on an imaginary straight line 13C and critical nodes 12E and 12C of the circuit parts 11E and 11C lie on an imaginary straight line 13A. However, it is not possible to place a straight line that passes through critical nodes of three circuit parts through the layout. It should be noted that although the imaginary straight line 13A also intersects the circuit part 11D, it does not intersect the critical node 12D of the circuit part 11D.

Such a layout can ensure that fewer than half of the circuit parts, in the example of FIG. 1 at most two, are struck by a single particle at least with a high degree of probability. Specifically, it can be assumed that such high-energy particles move in a straight line through the circuit with a high degree of probability.

Therefore, after such a strike of a particle passing through two critical nodes, at least more than half of the circuit parts, in the example of FIG. 1 three circuit parts, still have the correct state. For example, a correct value, for example a correct stored value or a correct output value of a logic gate, can then be ascertained correctly despite the particle event by means of a majority decision, which is explained further below with reference to FIG. 2.

In the exemplary embodiment of FIG. 1, the circuit parts 11, that is to say, in particular, the critical nodes 12, are arranged in the shape of an irregular pentagon. In this case, a pentagon is to be understood to mean a nondegenerate pentagon, that is to say a pentagon that does not have a 180° angle.

In some exemplary embodiments, it is not necessary that the circuit parts 11 retain a minimum spacing from one another. In particular, the spacing of the circuit parts from one another can be smaller than a path length that typical high-energy particles in the electronic circuit, for example a silicon-based electronic circuit or an electronic circuit based on another semiconductor, cover, for example smaller than 100 μm, smaller than 50 μm or smaller than 20 μm.

The arrangement of the five circuit parts 11 in one plane, for example on a chip, as illustrated in FIG. 1 and in other figures later too, is to be understood as merely one example of a possible arrangement. In other exemplary embodiments, a three-dimensional arrangement in a plurality of planes, for example on a plurality of stacked chips, can also be present. Therefore, for example, three circuit parts 11 can be provided on a first chip and two circuit parts 11 can be provided on a second chip stacked on the first chip, in order to produce such a three-dimensional arrangement. Also in the case of a three-dimensional arrangement of this kind, in exemplary embodiments, the circuit parts 11 are arranged in such a way that critical nodes of fewer than half of the circuit parts lie on an imaginary straight line.

It should be noted that the number of five circuit parts 11 in FIG. 1 is to be understood merely as an example, and also that more than five redundant circuit parts can be provided. In this case, the circuit parts can be arranged in such a way that, as explained above, critical nodes of fewer than half of the circuit parts lie on an imaginary straight line. For example, in the case of seven circuit parts, the circuit parts can be arranged in such a way that critical nodes of at most three circuit parts lie on an imaginary straight line. However, they can also be arranged in such a way that critical nodes of at most two circuit parts lie on an imaginary straight line. This can provide additional security for cases in which a particle with high energy is scattered and the direction thereof changes as a result. Such scattering can occur with a low degree of probability, in which case a particle could also influence three circuit parts 11A-11C—albeit with a low degree of probability. If this probability should be too high for a specific application, that is to say a higher degree of security is required in a specific arrangement, then, for example, seven circuit parts 11 can be used, wherein critical nodes of at most two of the seven circuit parts lie on an imaginary straight line, as explained above. In this respect, it should generally be noted that, depending on the application, a certain degree of insensitivity of an electronic circuit to particles is required, and the layout can be adjusted accordingly depending on the degree of required insensitivity. A one hundred percent security is not generally achieved here since events such as two or more particles can also occur at the same time with a certain degree of probability (albeit a very low one). Therefore, the measures illustrated above generally involve reducing the probability of an error due to particles, even if such errors cannot be excluded one hundred percent.

Figure 2:
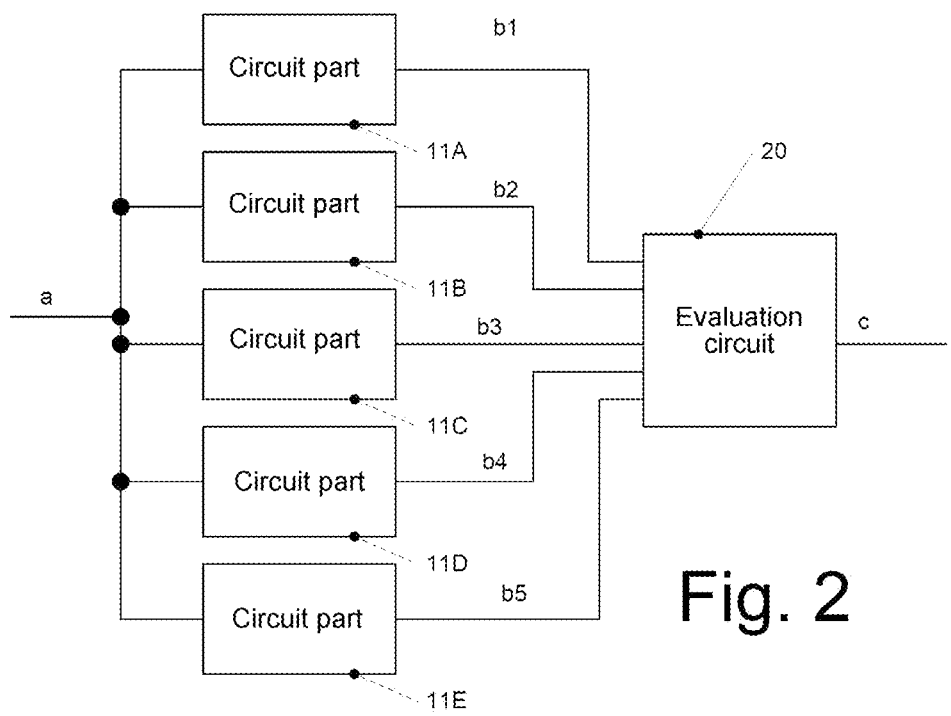
FIG. 2 shows a block diagram of an electronic circuit in accordance with some exemplary embodiments.

The concept of the evaluation of signals of redundant circuit parts arranged in this way is now explained with reference to FIG. 2. FIG. 2 shows here a block diagram in order to illustrate the interconnection of circuit parts with an evaluation circuit. FIG. 2 does not show a layout diagram, that is to say, in contrast to FIG. 1, it does not represent a spatial arrangement of the circuit parts with respect to one another but serves merely to illustrate an example for a possible electrical interconnection.

In FIG. 2, the circuit parts 11A-11E again serve as examples for at least five circuit parts. In terms of layout, the circuit parts 11A-11E can be arranged as explained with reference to FIG. 1.

In the exemplary embodiment of FIG. 2, inputs of the circuit parts 11A-11E are interconnected with one another in order to obtain one or more input signals a. That is to say, the same input signal a (or a plurality of identical input signals) is fed to each circuit part 11A-11E. For example, in a case in which the circuit parts 11A, 11E are memories, the signal a can comprise a value to be stored and/or a command (for example to read out the memory). In the case of error-free operation, the same value is then stored, for example, in each circuit part 11A-11E. In the case of logic gates, a plurality of identical input signals can be fed to each circuit part 11A, 11B (for example an identical first input signal and an identical second input signal can be fed to each circuit part), which signals are then combined logically in each circuit part, wherein, in error-free operation, the result of the logic combination is the same in each circuit part. Here, again, memories and logic gates serve merely as examples.

Output signals b1-b5 of the circuit parts 11A-11E are fed to an evaluation circuit 20. The output signals can, for example, specify read-out values in the case of a memory or can specify a result of a logic combination in the case of logic gates.

In the case of error-free functioning, the signals b1-b5 show an identical piece of information, for example an identical stored value or an identical result of a logic combination.

The signals b1-b5 are fed to the evaluation circuit 20, which outputs an output signal c based on the signals b1-b5. To this end, the evaluation circuit 20 can apply a majority decision with a majority criterion. In one case, the majority criterion specifies that the output signal c specifies a piece of information that is indicated by more than half of the output signals b1-b5, in the case of FIG. 2, that is to say by three or more output signals. In the case of a layout as in FIG. 1, in which a particle with high energy can strike at most critical nodes of two circuit parts, at most two signals b1-b5 are thus also distorted by such a particle with a high degree of probability, so that three correct signals remain. According to the majority criterion explained above, the output signal c then nevertheless still specifies the correct piece of information.

If a plurality of signals b1-b5 are used as majority criterion, an uneven number of circuit parts is used in some exemplary embodiments in order that a decision can be made in each case. However, other majority criteria can also be used. For example, it may be required that at least two thirds of the output signals of circuit parts have to output the same piece of information, which is then output as an output signal. In the case of six circuit parts 11, it would therefore be required that four signals b1-b5 specify the same piece of information. The term "majority decision" thus comprises majority decisions with various majority criteria such as more than half, at least two thirds, etc.

In such exemplary embodiments, the layout is selected in such a way that a number of circuit parts whose critical nodes lie on an imaginary straight line is less than or equal to a total number of circuit parts minus a number of signals necessary to meet the majority criterion. In the above example of six circuit parts with a two-thirds majority, the layout would thus be selected in some exemplary embodiments so that at most 6−4=2 circuit parts have critical nodes that lie on an imaginary straight line. In this case, a particle with high energy could adversely affect at most two circuit parts, with the result that four signals (the number necessary for the majority criterion) still indicate the correct value. If, in such an exemplary embodiment, three signals indicate one value and three signals indicate another value, no decision can be made, and, for example, an error message is output.

Therefore, various majority criteria are possible.

Carrying out a majority decision constitutes just one example of a possible error correction method. Other conventional error correction methods are also possible. For example, N, N>1, of the circuit parts can each store one bit in order to store an N-bit value overall, and M, M>=1, further of the circuit parts can each store a redundancy bit of an error correction code (for example Hamming code). In such an exemplary embodiment, the layout can then be selected in such a way that a number of circuit parts whose critical nodes lie on an imaginary straight line, is less than or equal to a total number of circuit parts minus a number of correct signals necessary to (correctly) carry out the error correction method.

Figure 3:
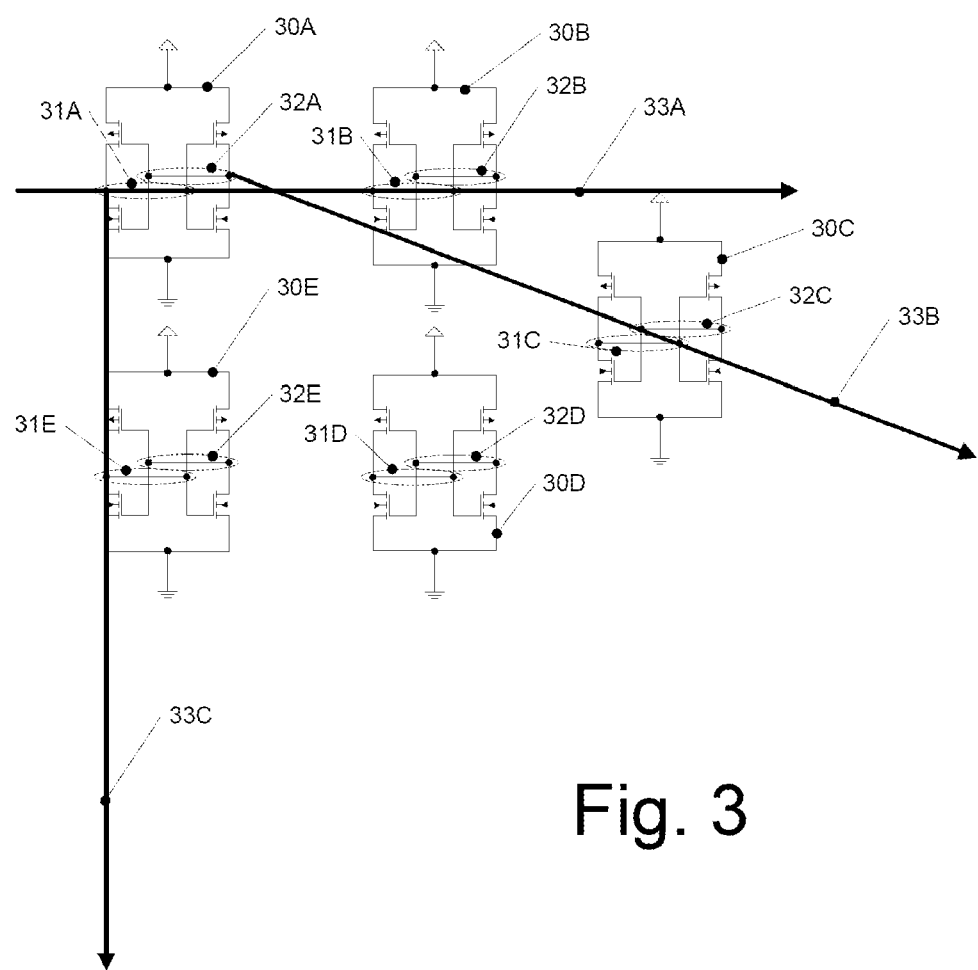
FIG. 3 shows a schematic layout of an electronic circuit in accordance with some exemplary embodiments.

FIG. 3 shows a schematic layout of circuit parts of an electronic circuit in accordance with some exemplary embodiments. To avoid repetitions, the explanation of FIG. 3 refers to the explanations presented above with reference to FIGS. 1 and 2.

The electronic circuit of FIG. 3 comprises five redundant memory cells 30A-30E, which are each designed as a latch. The memory cells 30A-30E can be, for example, part of a static random access memory (SRAM). In the example illustrated in FIG. 3, all of the memory cells 30A-30E have the same circuit layout, which is based on four transistors. In other exemplary embodiments, memory cells can have different circuit layouts. As explained already with reference to FIGS. 1 and 2, the number of five memory cells serves merely as an example.

The memory cells 30A-30E each have critical nodes 31A, 32A. The piece of information is stored in these nodes in the respective latch, wherein one of the nodes (for example 31A) has the inverse value of the other node (for example 32A). For example, the node 31A can be at a voltage level that indicates a logic zero, then the node 32A is at a voltage level that indicates a logic 1, or vice versa. In this way, two different states can be stored in each memory cell 30, corresponding to storage of a bit.

FIG. 3 shows an exemplary layout in which the circuit parts 30A-30E are arranged in such a way that critical nodes of fewer than half of the circuit parts, in this case of two circuit parts, are on a line. In this case, the arrangement of the circuit parts 30A-30E corresponds again to a pentagon, as already explained with reference to FIG. 1. In this way, a particle with high energy influences at most two of the five circuit parts 30A-30E with a high probability (except for cases in which scattering and therefore a change of direction take place, which has a low probability as explained above). As an example, arrows 33A, 33B and 33C illustrate three possible trajectories of particles. In the example of FIG. 3, the particle passes through the critical nodes 31A and 31B in accordance with the arrow 33A and can therefore change the value stored in the circuit parts 30A and 30B. However, the circuit parts 30C, 30D and 30E are not influenced thereby and can deliver a correct output value overall by means of a majority decision as explained with reference to FIG. 2. In the same manner, a particle can change the value stored in the circuit parts 30A and 30C in accordance with the arrow 33B, whereby the correct value remains in the circuit parts 30B, 30D and 30E. A particle in accordance with arrow 33C can change the value stored in the circuit parts 30A and 30E, wherein, in this case, the correct value remains in the circuit parts 30B, 30C and 30D.

In this way, the circuit as a whole can be protected against such particles.

The explanations given with reference to FIGS. 1 and 2 with respect to scattering of particles also apply to FIG. 3.

Figure 4:
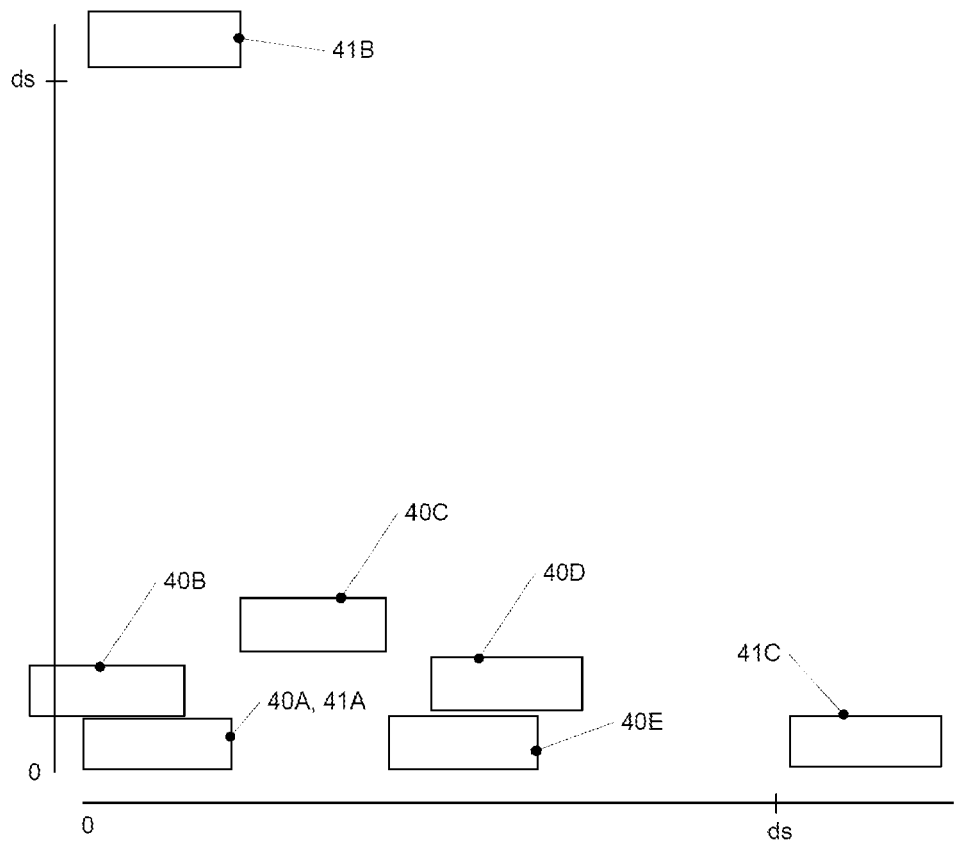
FIG. 4 shows a schematic layout of a circuit in accordance with some exemplary embodiments and in accordance with a comparative example.

FIG. 4 schematically shows a layout of an electronic circuit in accordance with some exemplary embodiments and a layout of a comparative example.

In an exemplary embodiment illustrated in FIG. 4, five circuit parts 40A-40E are provided, which are arranged in such a way that critical nodes of not more than two of the circuit parts 40A-40E lie on an imaginary straight line. The circuit parts 40A-40E can correspond to the circuit parts 11A-11E of FIG. 1 or to the circuit parts 30A-30E of FIG. 3, and all of the explanations and modifications given in this respect can also be applied to the exemplary embodiment of FIG. 4.

In a comparative example, three redundant circuit parts 41A, 41B and 41C are provided, wherein the position of the circuit part 41A corresponds to the position of the circuit part 40A. The spacing between the circuit parts 41A and 41C is greater than a prescribed minimum spacing ds, and the spacing between the circuit part 41A and the circuit part 41B is likewise greater than the prescribed minimum spacing ds, wherein the spacing in FIG. 4 is illustrated starting from the respective corner, illustrated on the bottom left, of the respective circuit parts.

The minimum spacing ds is selected here to be greater than a typical flying distance of a particle with high energy in the respective circuit, for example in silicon, in the case of a silicon-based circuit. The probability that a single particle strikes two of the circuit parts 41A, 41C and 41B is thus at least very low, since the probability that a particle has such a high energy that it covers a greater distance than ds is very low. Therefore, only one of the circuit parts 41A, 41B and 41C is struck by a particle with a high probability, and a correct value can then be determined using a majority decision.

Although the exemplary embodiment illustrated in FIG. 4 requires more circuit parts than the comparative example (5 compared to 3), these do not have to retain the minimum spacing ds and can be arranged closer to one another, as FIG. 4 schematically illustrates. The distance ds can be, for example, 100 μm, 50 μm or 20 μm, depending on the implementation and required protection against particles with high energy, and the spacing of adjacent circuit parts 40A-40E from one another can be significantly smaller than said value.

In some exemplary embodiments, the value ds can, in particular in the case of small structure sizes, lead to the circuit parts 41B, 41C lying in another circuit part or even on another chip to the circuit part 40A. This can make at least the routing, that is to say providing the necessary electrical connections (for example connections as shown in FIG. 2), more difficult.

Therefore, in some exemplary embodiments, it is possible to achieve a situation in which all of the circuit parts (for example 40A-40E of FIG. 4) lie comparatively close to one another and therefore are arranged in the same block of a circuit, which can facilitate the routing in some exemplary embodiments.

Figure 5:
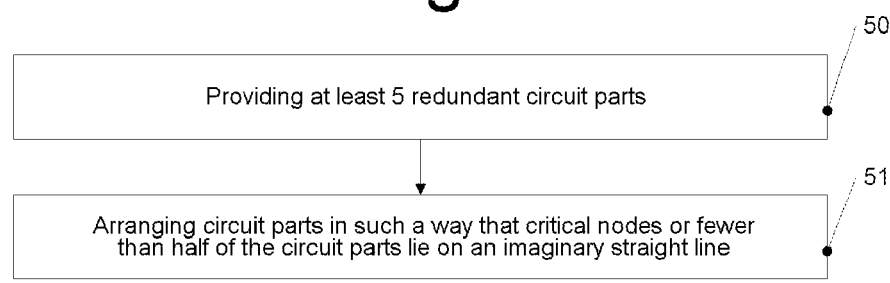
FIG. 5 shows a flowchart to illustrate methods in accordance with various exemplary embodiments.

FIG. 5 is a flowchart to illustrate a method in accordance with some exemplary embodiments. The method of FIG. 5 can be a method for producing an electronic circuit or a method for designing an electronic circuit, as will be explained below.

In particular, the method of FIG. 5 can be used to produce and to design the electronic circuits discussed with reference to FIGS. 1-4. To avoid repetitions, the method of FIG. 5 is explained with reference to FIGS. 1-4 and the explanations given there. However, the method of FIG. 5 can also be used to produce or design other electronic circuits than those shown in FIGS. 1-4.

In the method of FIG. 5, in 50, at least five redundant circuit parts are provided. In the case of a production method, providing can comprise forming the circuit parts on a semiconductor wafer such as a silicon wafer. In a method for designing a circuit, providing can comprise selecting the circuit parts to be implemented. The circuit parts can be circuit parts as discussed with reference to FIGS. 1-4, for example memory elements or logic gates.

In 51, the method comprises arranging the circuit parts in such a way that critical nodes of fewer than half of the circuit parts lie on an imaginary straight line. In particular, the circuit parts can be arranged in such a way that critical nodes of at most a number of circuit parts equal to a total number of redundant circuit parts minus the number of signals of circuit parts for meeting a majority criterion lie on an imaginary straight line, as likewise already explained above with reference to FIGS. 1-4.

In a production method, this arrangement takes place at the same time as the provision of the circuit parts, in particular at the same time as the formation of the circuit parts on or in a semiconductor wafer. In a method for designing a circuit, the circuit parts are arranged in a layout of the circuit, which is then implemented later.

Figure 6:
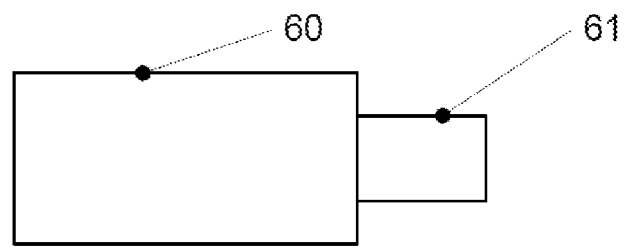
FIG. 6 shows an example of an electronically readable data storage medium that can serve to store a computer program in accordance with some exemplary embodiments.

The design method can be implemented by means of a computer program, which, when it is executed on a processor or a plurality of processors, executes the method explained above for designing circuits. In this case, the method can be executed, in particular, as an extension of a conventional method for designing circuits, wherein other parts of the method can be implemented by means of conventional approaches. Such a computer program can be stored on an electronically readable data storage medium. As an example, FIG. 6 shows a USB stick 60 with a USB (universal serial bus) port 61, on which USB stick the computer program can be stored. The computer program can also be stored on other conventional data storage media, such as a disk, an optical data storage medium, such as a DVD or a CD, or in a memory as a data storage medium. In other variants, the computer program is provided by means of a network, such as the internet.

Although specific exemplary embodiments have been illustrated and described in this description, persons with conventional knowledge in the art will recognize that a multiplicity of alternative and/or equivalent implementations can be selected as substitutes for the specific exemplary embodiments shown and described in this description, without departing from the scope of the invention shown. It is the intention that this application covers all adaptations or variations of the specific exemplary embodiments discussed here. Therefore, it is intended that this invention is limited only by the claims and the equivalents of the claims.

What is claimed is:

1. An electronic circuit, comprising:
   at least five redundant circuit parts, which are configured to execute a same function in order to provide redundancy,
   wherein the at least five redundant circuit parts are physically arranged in such a way that critical nodes of fewer than half of the at least five redundant circuit parts lie on an imaginary straight line.

2. The electronic circuit as claimed in claim 1, wherein the at least five redundant circuit parts are interconnected with one another to receive an identical input signal.

3. The electronic circuit as claimed in claim 1, wherein the at least five redundant circuit parts are arranged on a chip.

4. The electronic circuit as claimed in claim 1, further comprising an error correction circuit, which is interconnected with the at least five redundant circuit parts and is configured to output an output signal based on signals of the at least five redundant circuit parts.

5. The electronic circuit as claimed in claim 4, wherein a number of the at least five redundant circuit parts whose critical nodes lie on the imaginary straight line is less than or equal to a number of the at least five redundant circuit parts minus a number of correct signals necessary for the error correction circuit to correct errors in the signals of the at least five redundant circuit parts.

6. The electronic circuit as claimed in claim 4, wherein the error correction circuit is configured to make a majority decision based on the signals of the at least five redundant circuit parts.

7. The electronic circuit as claimed in claim 1, wherein a spacing between adjacent circuit parts of the at least five redundant circuit parts is smaller than 100 µm.

8. The electronic circuit as claimed in claim 1, wherein the at least five redundant circuit parts comprise exactly five circuit parts arranged in a shape of a pentagon.

9. The electronic circuit as claimed in claim 1, wherein the at least five redundant circuit parts each comprise a memory circuit.

10. A method for producing an electronic circuit, comprising:
    providing at least five redundant circuit parts, which are configured to execute a same function in order to provide redundancy,
    wherein the at least five redundant circuit parts are physically arranged in such a way that critical nodes of fewer than half of the at least five redundant circuit parts lie on an imaginary straight line.

11. The method as claimed in claim 10,
    wherein providing the at least five redundant circuit parts comprises forming the at least five redundant circuit parts on a chip.

12. The method as claimed in claim 10, further comprising:
    interconnecting the at least five redundant circuit parts to receive an identical input signal.

13. The method as claimed in claim 10, further comprising:
    providing an evaluation circuit, and
    interconnecting the evaluation circuit with the at least five redundant circuit parts,
    wherein the evaluation circuit is configured to output an output signal based on signals of the at least five redundant circuit parts and on an error correction method.

14. A computer-implemented method for designing an electronic circuit, comprising:
    providing at least five redundant circuit parts, which are configured to execute a same function in order to provide redundancy, in a circuit layout, and
    physically arranging the at least five redundant circuit parts in the circuit layout in such a way that critical nodes of fewer than half of the at least five redundant circuit parts lie on an imaginary straight line.

15. The method as claimed in claim 14,
    wherein providing the at least five redundant circuit parts comprises providing the at least five redundant circuit parts in a layout of a chip.

16. The method as claimed in claim 14, further comprising:
    providing an interconnection of the at least five redundant circuit parts in the circuit layout to receive an identical input signal.

17. The method as claimed in claim 14, further comprising:
    providing an evaluation circuit in the circuit layout, and
    providing an interconnection of the evaluation circuit with the at least five redundant circuit parts in the circuit layout,
    wherein the evaluation circuit is configured to output an output signal based on signals of the at least five redundant circuit parts and on an error correction method.

18. The method as claimed in claim 17,
    wherein the at least five redundant circuit parts are arranged in such a way that a number of the at least five redundant circuit parts whose critical nodes lie on the imaginary straight line is less than or equal to a number of the at least five redundant circuit parts minus a number of correct signals necessary to carry out the error correction method.

19. A non-transitory computer readable storage medium with an executable program stored thereon, the executable program including instructions to execute the method as claimed in claim 14 on one or more processors.

* * * * *